(12) United States Patent
Rummel

(10) Patent No.: US 7,676,763 B2
(45) Date of Patent: Mar. 9, 2010

(54) METHOD AND SYSTEM FOR PROVIDING AN OUTWARDLY EXPANDABLE RADIAL MENU

(75) Inventor: Bernard K. Rummel, Schriesheim (DE)

(73) Assignee: SAP AG, Walldorf (DE)

( * ) Notice: Subject to any disclaimer, the term of this patent is extended or adjusted under 35 U.S.C. 154(b) by 341 days.

(21) Appl. No.: 11/357,159

(22) Filed: Feb. 21, 2006

(65) Prior Publication Data

US 2007/0198949 A1     Aug. 23, 2007

(51) Int. Cl.
   *G06F 3/048* (2006.01)
(52) U.S. Cl. .................. 715/841; 715/810; 715/834; 715/845
(58) Field of Classification Search .............. 715/825, 715/828–829, 834–835, 841, 845, 739, 779, 715/823, 860, 863–864, 810, 817–818
   See application file for complete search history.

(56) References Cited

U.S. PATENT DOCUMENTS

| | | | | |
|---|---|---|---|---|
| 5,276,797 A | * | 1/1994 | Bateman et al. ............ | 715/823 |
| 5,500,935 A | * | 3/1996 | Moran et al. ............... | 715/863 |
| 5,701,424 A | * | 12/1997 | Atkinson .................... | 715/808 |
| 5,721,853 A | * | 2/1998 | Smith ........................ | 715/803 |
| 5,805,167 A | * | 9/1998 | van Cruyningen .......... | 715/808 |
| 5,926,178 A | * | 7/1999 | Kurtenbach ................ | 715/834 |
| 6,144,378 A | * | 11/2000 | Lee ............................ | 715/767 |
| 6,239,803 B1 | * | 5/2001 | Driskell .................... | 715/810 |
| 6,414,700 B1 | * | 7/2002 | Kurtenbach et al. ......... | 715/810 |
| 6,549,219 B2 | * | 4/2003 | Selker ....................... | 715/834 |
| 7,134,092 B2 | * | 11/2006 | Fung et al. ................. | 715/779 |
| 7,246,329 B1 | * | 7/2007 | Miura et al. ............... | 715/810 |
| 2007/0101296 A1 | * | 5/2007 | Won et al. .................. | 715/841 |

* cited by examiner

*Primary Examiner*—William L Bashore
*Assistant Examiner*—Andrew Tank
(74) *Attorney, Agent, or Firm*—Mintz, Levin, Cohn, Ferris, Glovsky and Popeo, P.C.

(57) ABSTRACT

An outwardly expandable radial menu, such as a plus-shaped menu, may be launched in a user interface screen and may include a center option and up to four other options arranged to the left, right, upward, and downward relative to the center option. The position of each of the options may be associated with certain option categories. A traditional selectable menu, such as drop down menu, may be appended to the plus-shaped menu. A determination may be made regarding whether a portion of the plus-shaped menu will exceed a display boundary of the user interface screen. A placeholder may be displayed in place of the portion that is determined to exceed the display boundary. In response to user navigation to the placeholder, the plus-shaped menu may be shifted so that the portion replaced by the placeholder may be displayed.

20 Claims, 14 Drawing Sheets

METHOD AND SYSTEM FOR PROVIDING AN OUTWARDLY EXPANDABLE RADIAL MENU

TECHNICAL FIELD

The field of the invention relates in general to computer systems and graphic user interface environments. More particularly, the field of the invention relates to presentation and manipulation of an outwardly expandable radial menu, such as an expandable plus-shaped menu, in a user interface screen.

BACKGROUND

It is common in today's computing environment to present information to a user in graphic user interfaces (GUIs). A suitable user interface screen may include, for example, a display region and a number of user interface controls, which may be presented in the form of menu bars. The menu bars may be expanded (i.e., in a drop down menu) to display various selectable options. Typically, the number of interactive functionalities that a user interface allows is proportional to the number of options displayed in connection with the menu bars on the user interface screen. Thus, the higher the number of options the harder it becomes to display the options in an organized and unobtrusive fashion on the user interface screen. The challenge is especially great when a considerable amount of valuable information is being displayed on the screen, which should not be covered by an overlay menu, and/or the display space allocated to the user interface screen and/or the menu is relatively small, for example, in a handheld device such as a personal digital assistant (PDA).

Conventional approaches to the above challenges have included such arrangements as providing sub-menus to a consolidated main menu, where the sub-menus may only appear when the user selects an option from the main menu. Unfortunately, when the sub-menu is expanded from the main menu, the entire nest of menus still takes up a lot of screen space. In the arrangement in which the main menu is made to disappear when the sub-menu appears, the user faces the difficulty of being unable to backtrack if the sub-menu turns out not to be what the user desires.

Other typical approaches to the above problem include restricting the number of options that the user may access in a particular user interface screen. The options that the user may access in association with a particular user interface screen may be pre-determined, for example, by a computer system based on what's been displayed on the user interface screen. Alternatively, the options may be user determined, for example, through user selections. A problem with these arrangements is that the system or the user cannot accurately anticipate which options the user may wish to access in a particular user interface screen and, therefore, may create unnecessarily restrictive menu options. These may frustrate the user.

A different and less frequently used approach to the above problem is a "bullseye" menu in which options are presented in progressively outward-expanded concentric cycles, much like a shooting target with a central bullseye. The options in circular layers that are closer to the center are higher level options. Associated lower level options may be displayed in additional circular layers that may be farther away radially from the center. One advantage of a bullseye menu is faster user selection. For example, by allowing the user to directly move a mouse pointer to a desired option in one of the concentric layers. Selection speed associated with this direct movement, calculated based on Fitt's law, which predicts the time required to rapidly move from a starting position to a final target area as a function of the distance to the target and the size of the target, is much faster than selection made from a traditional menu, such as a drop down menu. A disadvantage of the bullseye menu, is its rigid format, which requires an entire circular layer to be added to the outside of the concentric circles when a single option beyond the current outer layer is to be added. This expansion may sacrifice an unnecessary large amount of screen area. The bullseye menu's circular format also does not allow easy linear mapping of user selection steps through the layers.

In view of the above, a need exists for an improved way of presenting menu options on a user interface screen to provide easy access to desirable options and to minimize occupation of display space on the user interface screen.

SUMMARY

Consistent with the principles of the present invention, an outwardly expandable radial menu may be launched in a user interface screen. The radial menu may provide easy access to a desirable option through an intuitive process and efficient use of limited screen space for menu displays. The radial menu may be any suitable geometric shape that is capable of being expanded outwards in an asymmetrical fashion. Suitable radial menus may include a plus-shaped menu, a Y-shaped menu, a star shaped menu, or any other suitable outwardly expandable menu. For simplicity, a plus-shaped menu will be discussed below in connection with the functionalities and behaviors of a suitable radial menu.

In one suitable arrangement, an option for launching a plus-shaped menu may be displayed in the user interface screen. In response to a user selection of the above menu launch option, a plus-shaped menu may be displayed on the user interface screen. The plus-shaped menu, which is described in more detail below, may be arranged in such a way as to resemble a plus sign. More specifically, the plus-shaped menu may include a center option and up to four other options arranged to the left, right, upward, and downward relative to the center option. In some arrangements, the position of each of the options may be associated with certain option categories so as to maintain a consistent and/or predictable navigation format or process flow for the user.

The user may be allowed to navigate to an option in the plus-shaped menu. The option to which the user wishes to navigate may become highlighted or otherwise indicated as a response to the user navigation action. In response to the user navigating to a particular option, the plus-shaped menu may be expanded to include at least one additional option, which may be associated with the option that is navigated to. The at least one additional option may be displayed in any of a left, right, up, or down position in the expanding plus-shaped menu relative to the option navigated to by the user. In one suitable arrangement, a traditional selectable menu, such as drop down menu, may be appended to the plus-shaped menu. Alternatively or additionally, a selectable menu may be included as an element of a displayed option in the plus-shaped menu. In this way, an option in the plus-shaped menu may have multiple and/or different associated selectable menus as additional options. As an example, one of the above additional option, which is associated with an option navigated to by the user in the above expanded plus-shaped menu, may include a drop down menu, while another additional option, also associated with the same option navigated to by the user, may include a multiply-selectable menu, such as a calendar. An example of such selectable menus are shown in FIG. 8*a*.

Consistent with the principles of the present invention, a determination may be made, for example, during the process to expand a plus-shaped menu to incorporate additional options, that a portion of the expanded plus-shaped menu will exceed a display boundary of the user interface screen. In response to such a determination, a placeholder may be displayed in place of the portion of the plus-shaped menu that is determined to exceed the display boundary of the user interface screen. User navigation to the placeholder may be detected. In response to such detection, the plus-shaped menu may be shifted so that the portion replaced by the placeholder may be displayed on the user interface screen.

Further features and embodiments of the present invention will become apparent from the description and the accompanying drawings. It is understood that the features mentioned above and those described hereinafter may be used not only in the combination specified but also in other combinations or on their own, without departing from the scope of the present invention. It is also understood that the foregoing background, summary, and the following description of the systems consistent with the principles of the present invention are in no way limiting on the scope of the present invention and are merely illustrations of one or more embodiments of the present invention.

BRIEF DESCRIPTION OF THE DRAWINGS

Referring now to the drawings, in which like numerals represent like elements throughout the several Figures, aspects of the present invention and the exemplary operating environment are described.

DETAILED DESCRIPTION

Figure 1:
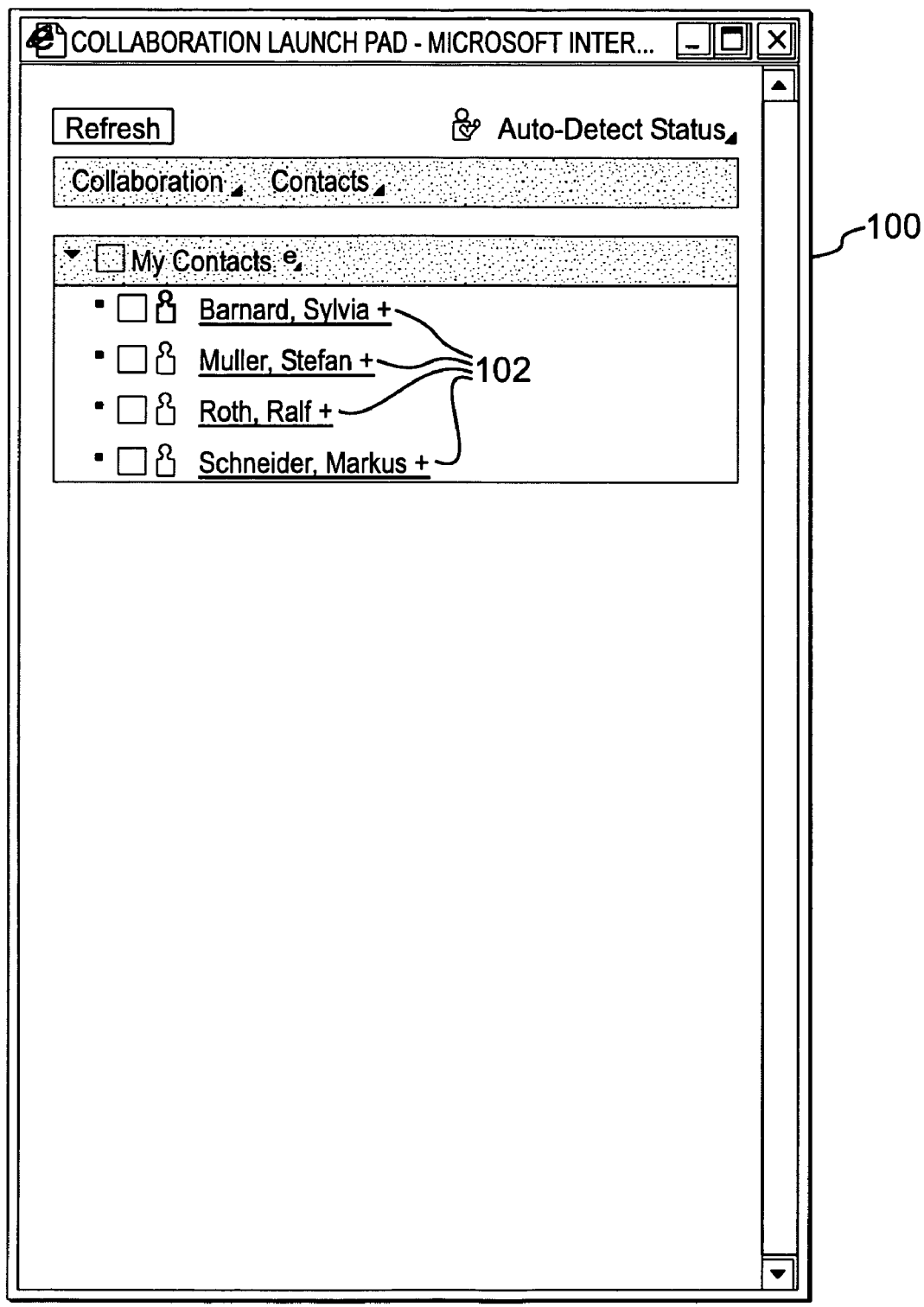
FIG. 1 is a screen shot showing an exemplary user interface screen in which menu launch options may be displayed.

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Consistent with the principles of the present invention, an outwardly expandable radial menu may be launched in a user interface screen. The radial menu may provide easy access to a desirable option through an intuitive process and efficient use of limited screen space for menu displays, which will be described in details below. The radial menu may be any suitable geometric shape that is capable of being expanded outwards in an asymmetrical fashion. Suitable radial menus may include a plus-shaped menu, a Y-shaped menu, a star shaped menu, or any other suitable outwardly expandable menu.

For simplicity, a plus-shaped menu is described below in connection with the functionalities and behaviors of a suitable radial menu. It will be understood that radial menus of any other shape may be used to perform these functionalities in a similar fashion without departing from the principles of the present invention.

FIG. 1 shows an exemplary user interface screen 100 in which such a plus-shaped menu may be launched. User interface screen 100 may be any suitable screen for facilitating user interactions. Screen 100 may be displayed on, for example, a computer, a television, a PDA, a phone, or any other suitable display device.

Any suitable interactive content may be displayed on user interface screen 100. In the present example, screen 100 displays a list of names, such as contacts in a personal organizer, in which each contact is associated with a corresponding plus-shaped menu launch option 102. The plus-shaped menu launch option 102 may be shown as a plus sign or any other suitable selectable option indicator. The user may select a plus-shaped menu launch option 102 by, for example, clicking on the appropriate indicator using a mouse, selecting it using hot keys on a keyboard, navigating to the option and selecting it using a joystick, or using any appropriate user action.

Figure 2:
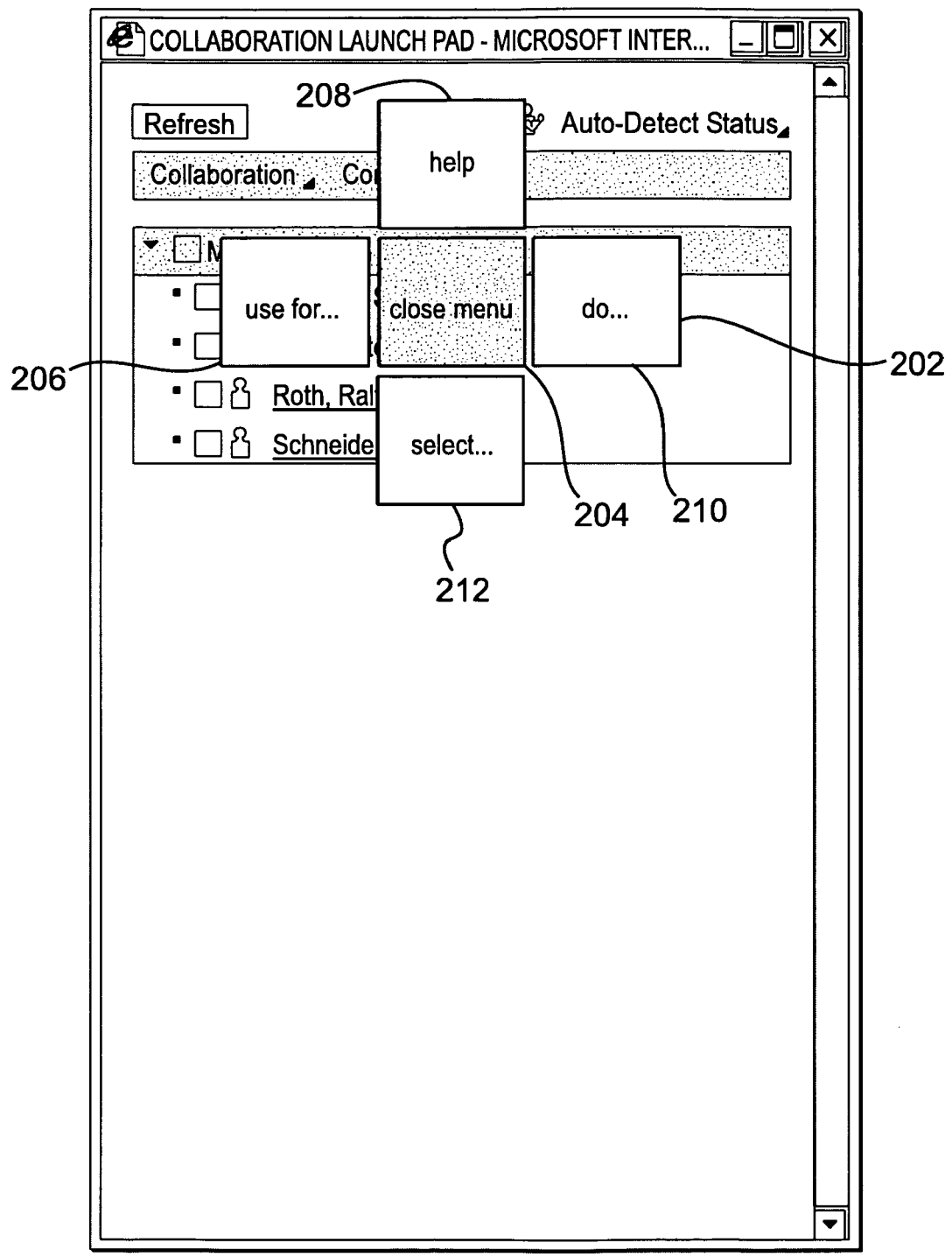
FIG. 2 is a screen shot showing an exemplary user interface screen in which a plus-shaped menu is displayed.

In response to user selection of a plus-shaped menu launch option 102, a plus-shaped menu 202 of FIG. 2 may be displayed on user interface screen 100 consistent with the principles of the present invention. In one suitable arrangement, plus-shaped menu 202 may hover over user interface screen 100 and may be made movable, for example, through mouse dragging or any other suitable user action.

Plus-shaped menu 202 may include multiple options that are associated with the option on user interface screen 100 for which menu 202 is launched. The multiple options may each be displayed in one of a left, right, up, down, and center portion of plus-shaped menu 202. Each of these options will be discussed in more details below. It will be understood that while plus-shaped menu 202 is shown to include all five options in the left, right, up, down, and center positions, a partial cross-shaped menu having a subset of these options surrounding the center option may be displayed in accordance with the principles of the present disclosure.

As illustrated by the present example, the content and relative positions of the displayed options 206-212 in the plus-shaped menu 202 may be associated with particular option categories, such as help categories, action categories, contextual use categories, selection categories, and/or any other suitable option categories. The relative positions of options associated with each of these categories may be kept constant, for example, through all plus-shaped menus that may be launched in the display space, so as to provide the user with a consistent navigation format or process. For example, in the present screen of FIG. 2, left option 206 belongs to options in the contextual use categories, which may include options directed to allowing the user to utilize the contact of FIG. 1 in some fashion; up option 208 is a part of help options; right option 210 is directed to actions that may be performed upon the contact, and down option 212 is associated with selection options. Each of these options and option categories are described in more detail below.

In the present example, the center option 204 for closing the menu is highlighted to indicate the user's current navigation position in the plus-shaped menu. It will be understood that while a close menu option is shown in the present example, such an option may be omitted in another suitable arrangement consistent with the principles of the present invention. In such an alternative arrangement, the menu may be closed, for example, when the user navigates away from the menu, when the user selects a suitable closing key on a keyboard, or when any other suitable menu closing event takes place.

Consistent with the principles of the present invention, the user may navigate away from the highlighted center option 204 to any one of options 206-212 by, for example, moving a mouse pointer over to one of these options, using arrow keys provided on a keyboard to navigate to one of these options, clicking on one of these options, or using any other suitable navigation method to indicate interest in an option. As shown in the present example, the option description displayed in connection with each of options 206-211 may be arranged in a suitable fashion, for example, in a shortened form, in a partially obviated form, in symbols, or in any other suitable form, so as to accommodate the size of the space allocated to the option in the menu, which may be small, such as in a PDA screen.

Figure 3:
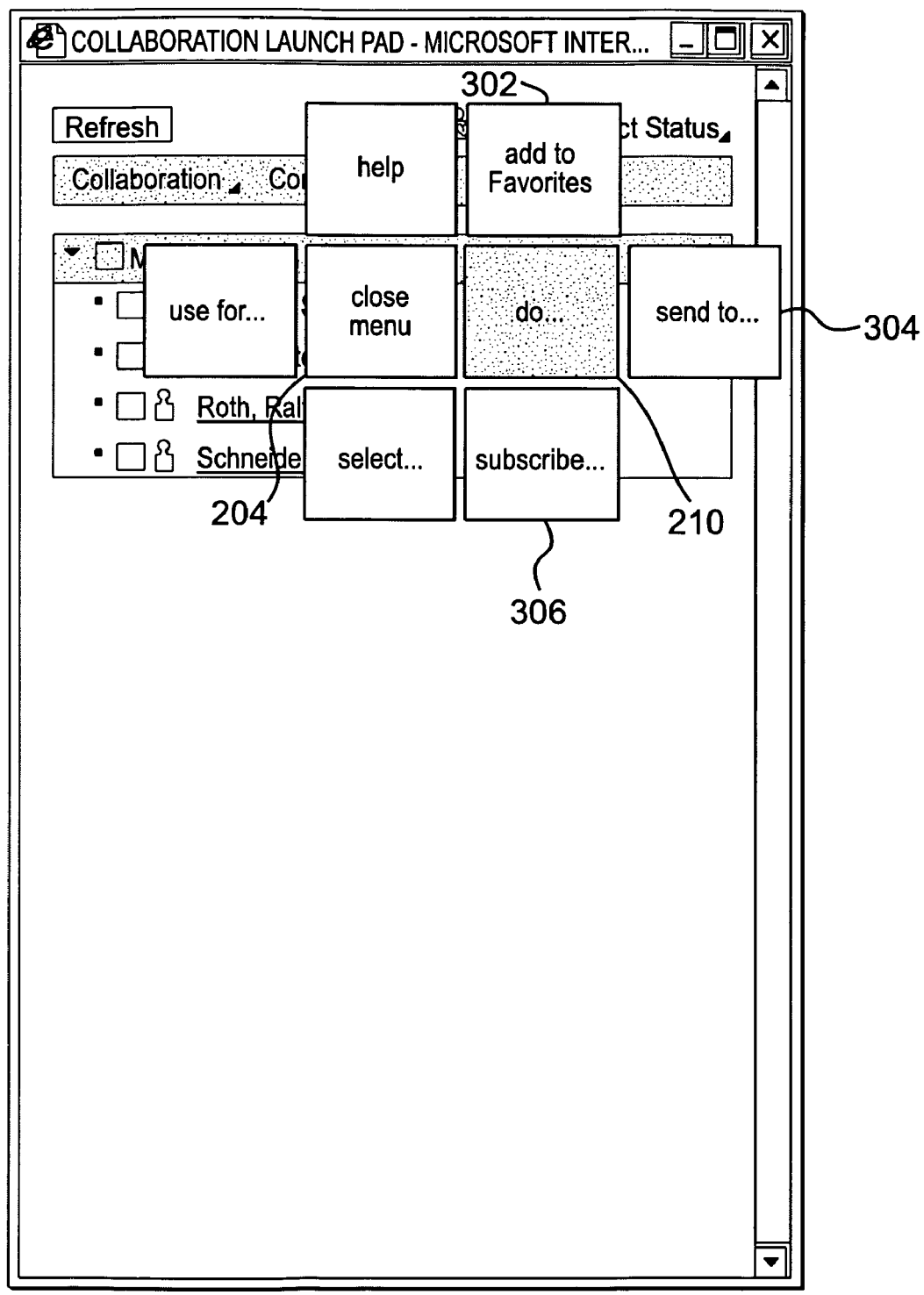
FIG. 3 is a screen shot showing an exemplary user interface screen in which an expanded plus-shaped menu is displayed as an extension of the menu launch option in FIG. 2.

Once plus-shaped menu 202 is displayed, the user may navigate away from the highlighted center option 204 to each of the options 206-212 by, for example, navigating the mouse to hover over one of the options 202-212, clicking on an option, using arrow keys to move to an option, or using any other suitable navigation method to indicate interest in an option. FIG. 3 illustrates a situation in which the user has navigated to the right option 210. In response to this user action, the highlight region may be shifted away from center option 204 to right option 210. Also in response to this user action, the plus-shaped menu 202 of FIG. 2 may be expanded to include additional options that are associated with the right option 210. In this example, the right option 210, as discussed above, is associated with actions that may be performed upon the contact. Accordingly, the new options 302-306 are each directed to such an action, which includes adding the contact to favorites (302), sending the contact to an outside source (304), and subscribing the contact to, for example, a mailing list (306). Any other action-related options may be included without departing from the spirit of the present invention.

In some suitable arrangements, as illustrated by the present example, expansion of the plus-shaped menu may be restricted in such a way that no addition of options may cause any previously displayed options to become covered or otherwise undesirably obscured. In this example of FIG. 3, the new options were added in the up, right, and down positions relative to the highlighted option 210, but no option has been added to the left of option 210 to obscure the close menu option 204. While this arrangement may be desirable in certain circumstances, other suitable formats may be used without departing from the principles of the present invention. For example, a new option may be created in a smaller shape to hover over close menu option 204 in FIG. 3, thereby allowing both options to appear to the user.

Figure 4:
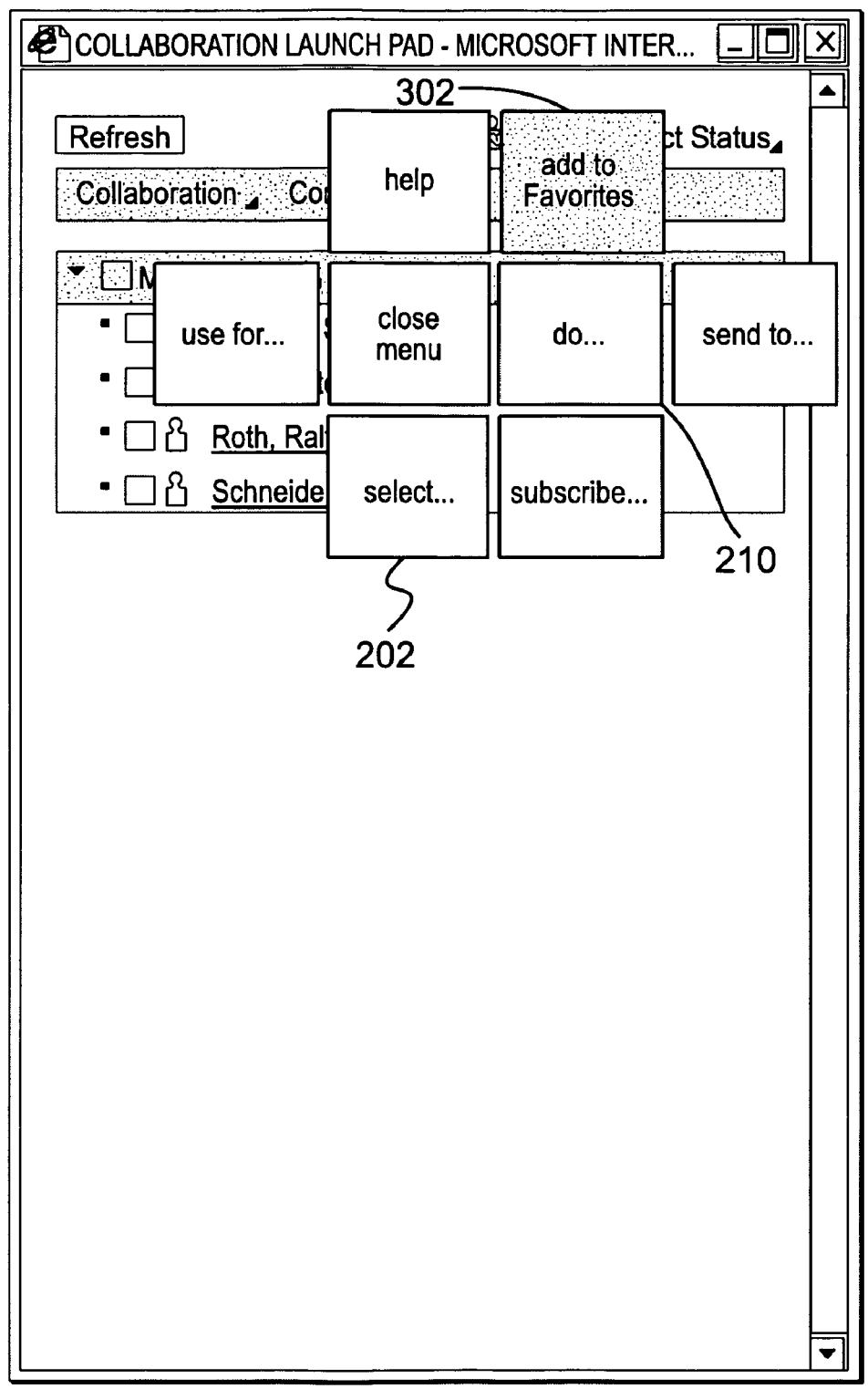
FIG. 4 is a screen shot showing an exemplary user interface screen in which a final selectable option is highlighted in the plus-shaped menu of FIG. 3.

Similar to the navigation procedure discussed above, the user may again navigate away from option 210 of FIG. 3 to option 302 as shown in FIG. 4. In response to the user navigating to option 302 of FIG. 4, this option may become highlighted as shown. Unlike in FIG. 3, the plus-shaped menu 202 did not further expand to reveal additional options associated with option 302, which may be because no additional options are associated with option 302. If option 302 is indeed a final option with no associated lower-level options, option 302 may be presented as a finally selectable option to the user consistent with the principles of the present invention. As an example, in addition to the highlight region, an indication may be given to alert the user that option 302 may be selected. Suitable indication may include, for example, a different-colored highlight region, a small hand selection indicator displayed over option 302, or any other suitable indication of selectability. In some suitable arrangements, an indicator may not be necessary if the user is aware that final options with no associated lower-level options are selectable. Selection of option 302 may, for example, cause an add-to-favorite form or other mechanism to be displayed. It will be understood that actions taken in response to a final selection of an option in the plus-shaped menu may be the same or substantially similar to such actions taken in response to a selection in a traditional selectable menu, such as a drop-down menu.

Figure 5:
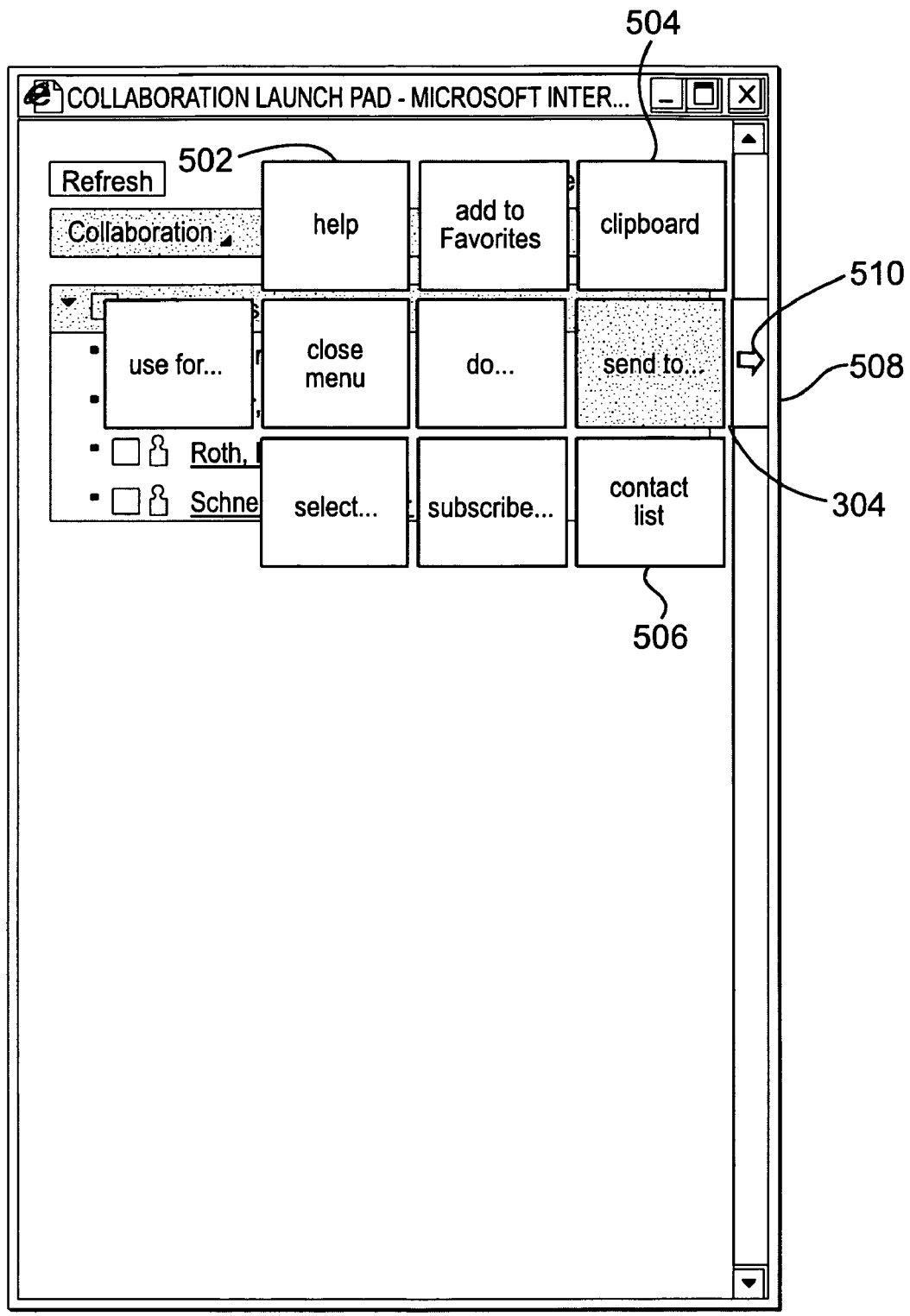
FIG. 5 is a screen shot showing an exemplary user interface screen in which a portion of the plus-shaped menu in FIG. 4 is replaced with a placeholder.

Unlike final option 302, option 304, which was incorporated into the plus-shaped menu at the same time as option 302, may have additionally associated lower-level options, which may be incorporated into a further expanded plus-shaped menu 502 of FIG. 5. The incorporation and display of the additional options may be carried out in the manner described above in connection with the expansion of the plus-shaped menu in FIG. 3. In the present example, three additional options are incorporated into the plus-shaped menu in connection with option 304. While screen space is available to accommodate newly incorporated options 504 and 506, there is insufficient screen space to accommodate an additional option to the right of option 304. When such a situation is detected, an option placeholder 508, which may be created to display properly in the limited screen space remaining, may be incorporated as a replacement for the option that could not be properly displayed in that space. The option placeholder 508 may include a suitable indicator, such as an arrow 510 or any other indicator, to let the user know that additional options are available in the relative position of placeholder 508.

In some embodiments, a placeholder such as placeholder 508 may be used to replace a portion of the plus-shaped menu even when display space is available to accommodate display of the replaced portion. This type of replacement may be implemented, for example, to avoid covering up certain information that is being displayed on the user interface screen.

Figure 6:
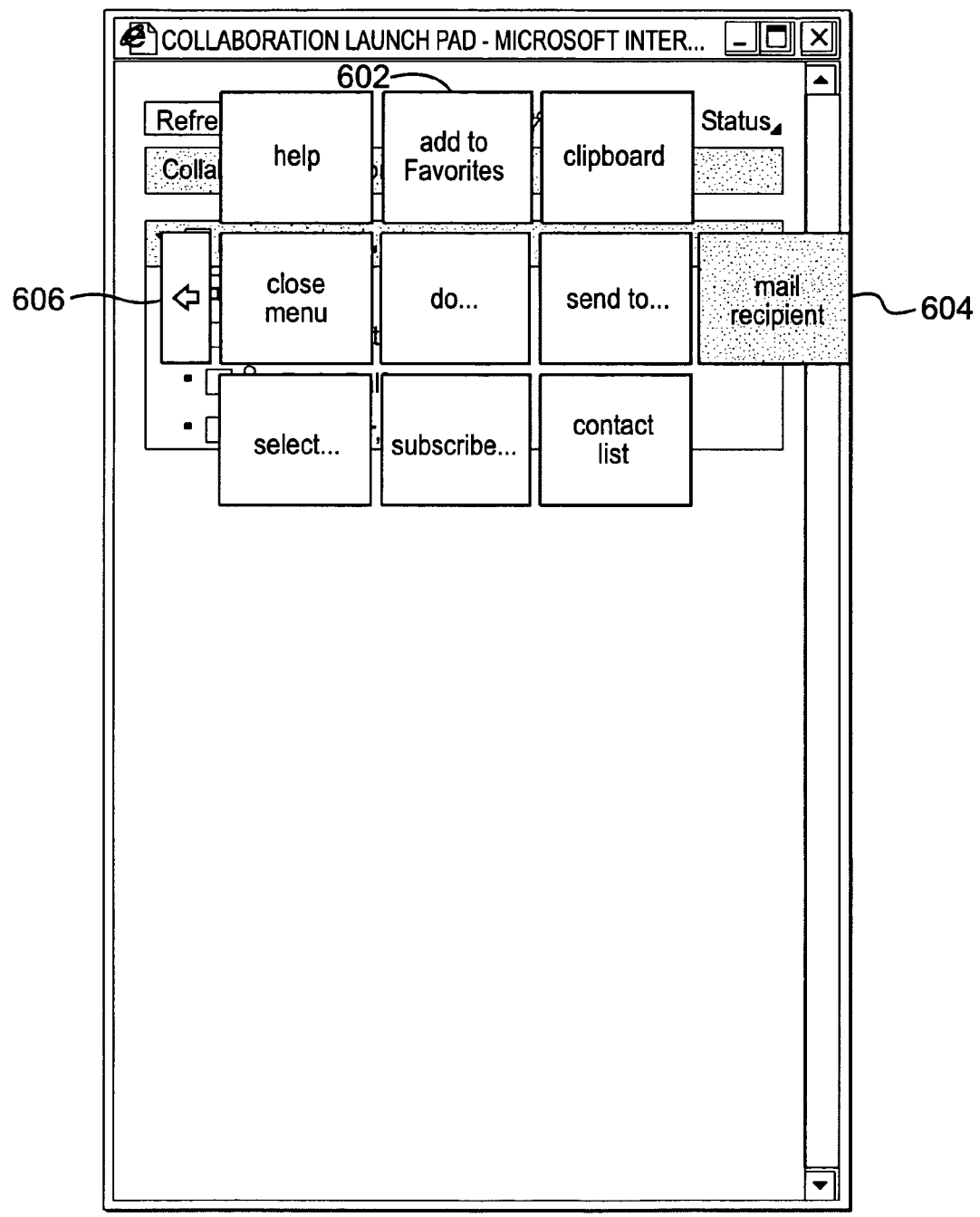
FIG. 6 is a screen shot showing an exemplary user interface screen in which the plus-shaped menu of FIG. 5 has been shifted so a portion of the menu that was previously replaced with a placeholder is displayed.
Figure 7:
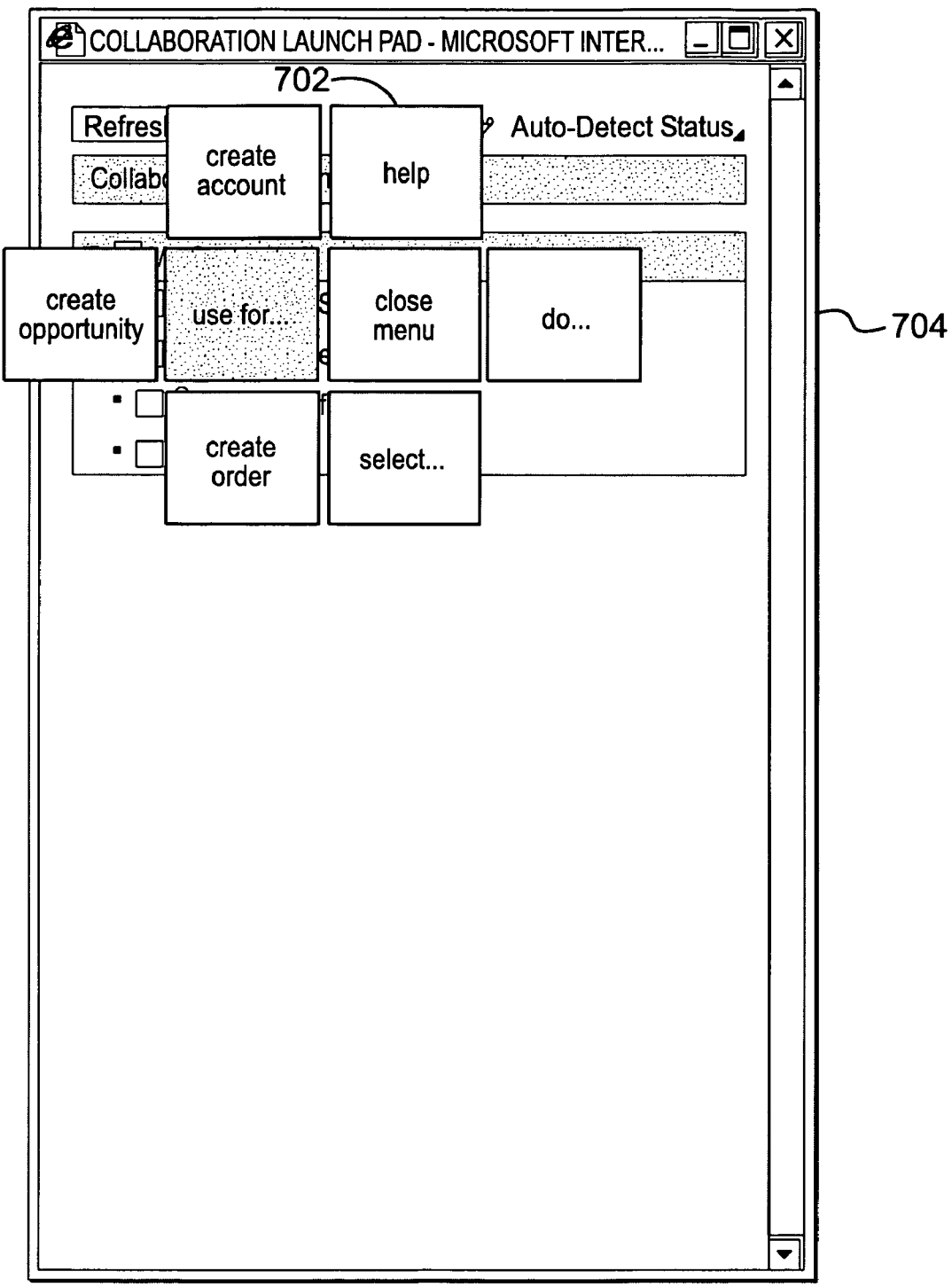
FIG. 7 is a screen shot showing an exemplary user interface screen in which a plus-shaped menu exceeds the boundary of the user interface screen.

Consistent with the principles of the present invention, the user may navigate to placeholder 508 in a fashion similar to navigation to any other fully displayed options. In response to the user navigating to placeholder 508, the plus-shaped menu 602 of FIG. 6 may automatically shift by an appropriate proportion so that option 604, which was previously replaced by placeholder 508 of FIG. 5, may become fully displayed. In some suitable arrangements, automatic shifting of the plus-shaped menu 602 may involve employing another placeholder 606 to replace a previously displayed portion of the menu that has become unable to be fully displayed due to the shifting and screen space limitations. If, however, sufficient space is available on the screen, all options of the expanded plus-shaped menu 602 may be displayed in full consistent with the principles of the present invention. In some suitable arrangements, a plus-shaped menu 702, as shown in FIG. 7, may exceed the display boundary of screen 704. Such a display arrangement may be implemented, for example, when screen 704 does not occupy the entire display space of the device on which it is being displayed.

Figure 8:
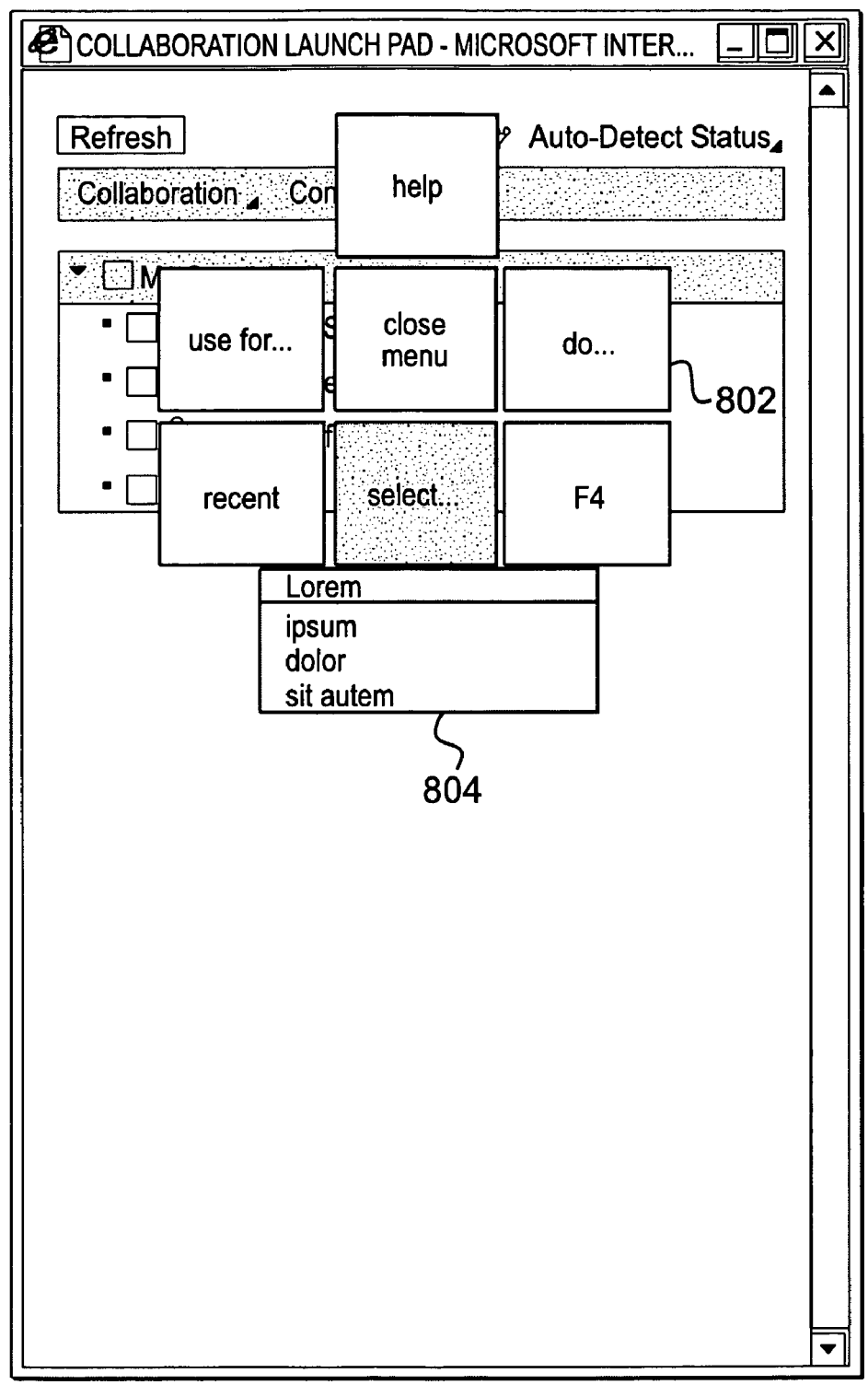
FIG. 8 shows an exemplary user interface screen in which a traditional selectable menu is appended to a portion of the plus-shaped menu of FIG. 2.

Consistent with the principles of the present invention, traditional selectable menus and other suitable tools for facilitating selection of options may be incorporated into the plus-shaped menu. FIG. 8 shows such a plus-shaped menu 802 in which a traditional drop down menu 804 is appended to plus-shaped menu 802 in the position of an option. The user may navigate to drop down menu 804 in the same fashion as described above in connection with navigation to options in a plus-shaped menu. Selection within drop down menu 804 may be the same or substantially similar to what is commonly known. It will be understood that while drop down menu 804 is shown in FIG. 8, any other suitable selection mechanism may be appended to plus-shaped menu 802 without departing from the spirit of the present invention.

Figure 8A:
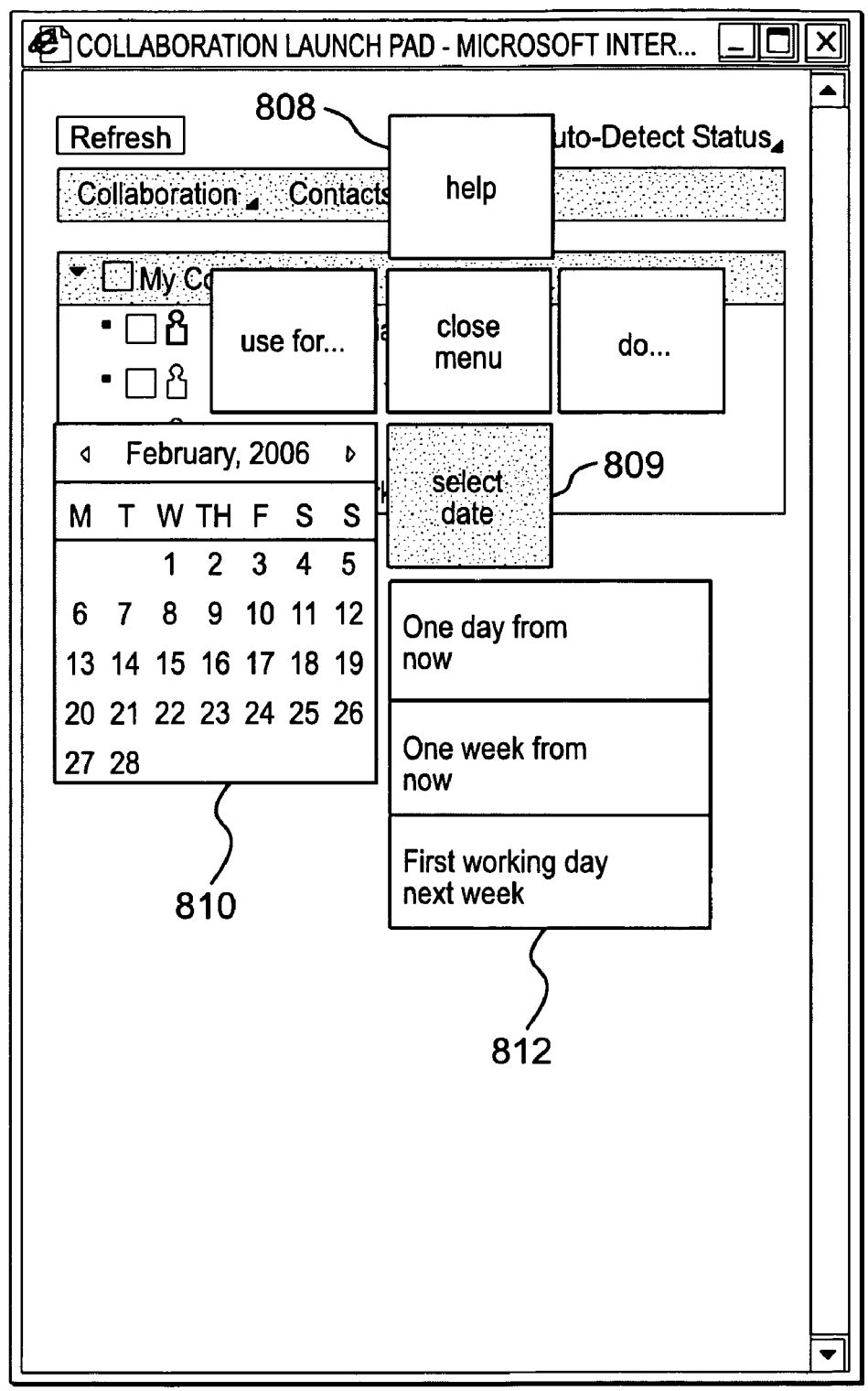
FIG. 8a shows an exemplary user interface screen in which multiple selectable menus are included as additional options associated with a first option in the plus-shaped menu.

Alternative or in addition to the arrangement illustrated in FIG. 8, one or more selectable menus of various types may be incorporated as elements in one or more options associated with an option navigated to by the user in the expanded plus-shaped menu. An example of such an arrangement is shown in FIG. 8*a*. In this way, the user may be provided with a variety of methods for making further selections in connection with an option that the user has navigated to.

In the example of FIG. 8*a*, the plus-shaped menu of FIG. 2 has been expanded, for example, in response to the user navigating to the highlighted option 809, labelled "select date." The expanded plus-shaped menu 808 is shown to be associated with two additional options 810 and 812, where each of the options 810 and 812 includes a selectable menu. More specifically, a selectable calendar is incorporated in additional option 810, in which the user may select one or more dates, for example, by clicking on the dates, by highlighting the dates through mouse dragging, or by using any other suitable means of making singular or multiple selections. Additional option 812, on the other hand, is shown to include a drop down menu, in which the user may choose an option using any known selection method in connection with a drop down menu. Any other suitable selectable menus may be used in place of or in addition to the menu types discussed above without departing from the spirit of the present invention.

It will be understood that the above FIGS. 1-8*a* are merely illustrative of the user interface screens and the plus-shaped menus that may be implemented consistent with the principles of the present invention. Any other suitable screens and variations of the plus-shaped menus may be used without departing from the spirit of the present invention.

Figure 9:
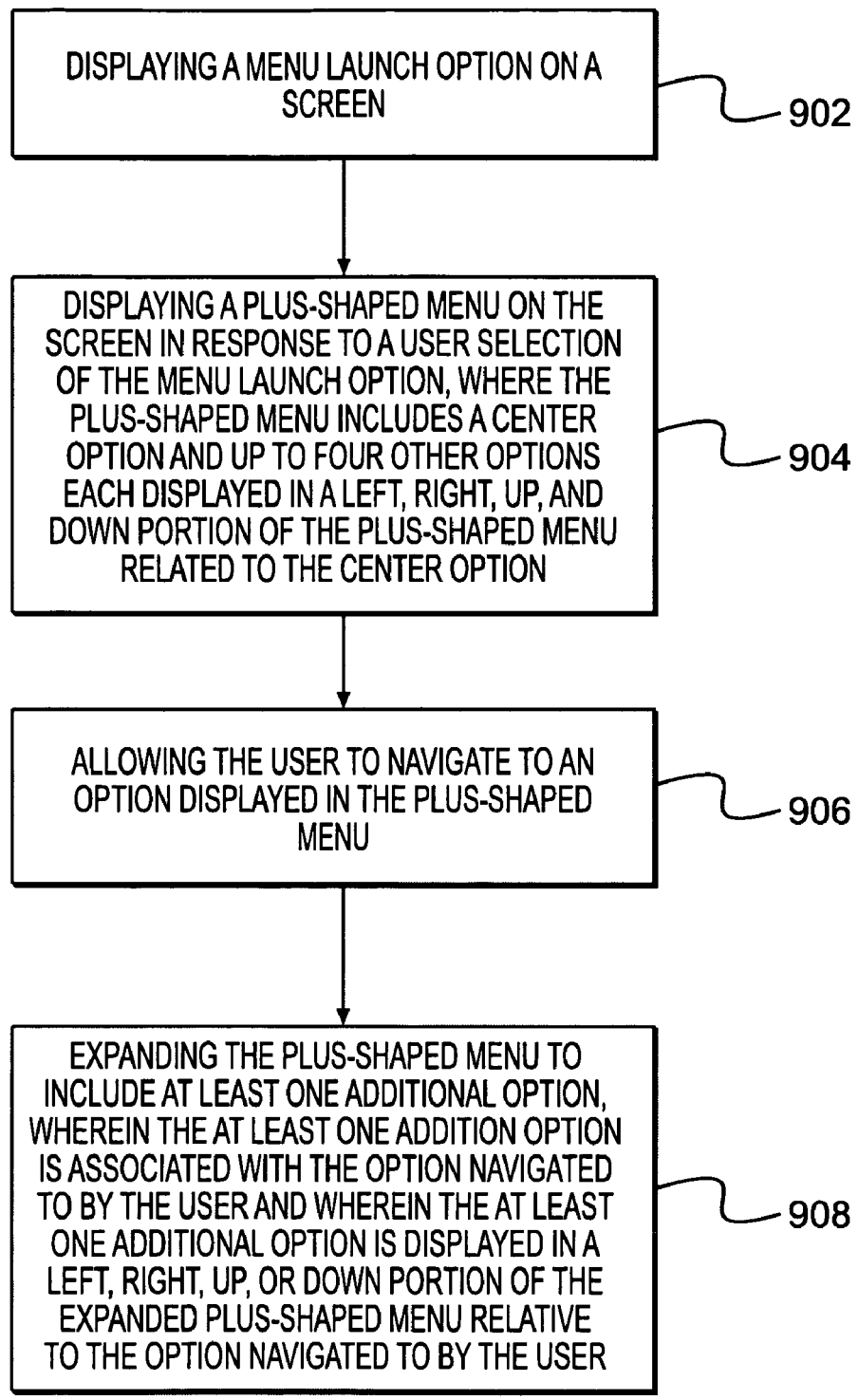
FIG. 9 shows an illustrative flowchart having stages involved in displaying an expandable plus-shaped menu on a user interface screen.
Figure 10:
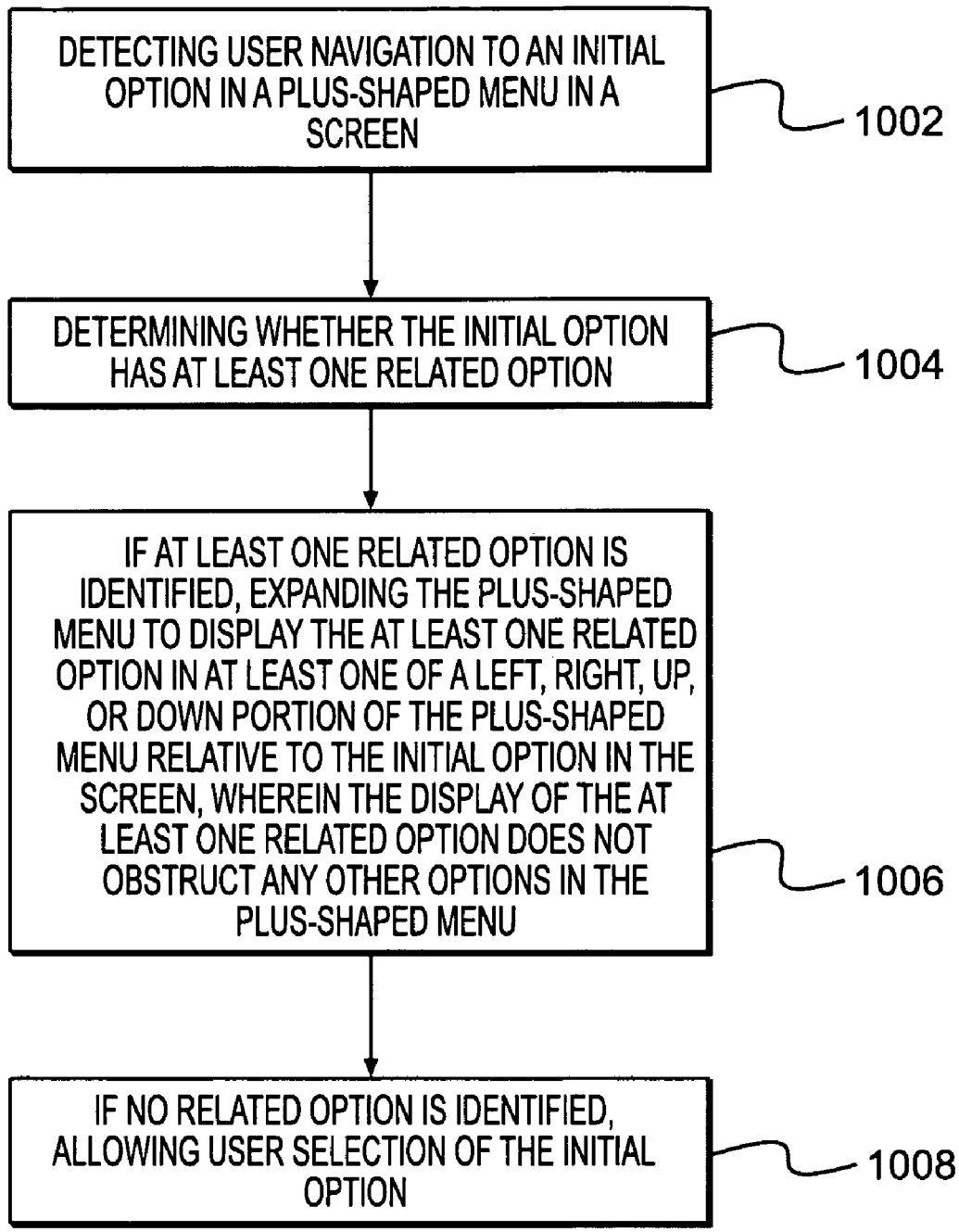
FIG. 10 is a flowchart showing stages involved in displaying an expandable plus-shaped menu on a user interface screen.
Figure 11:
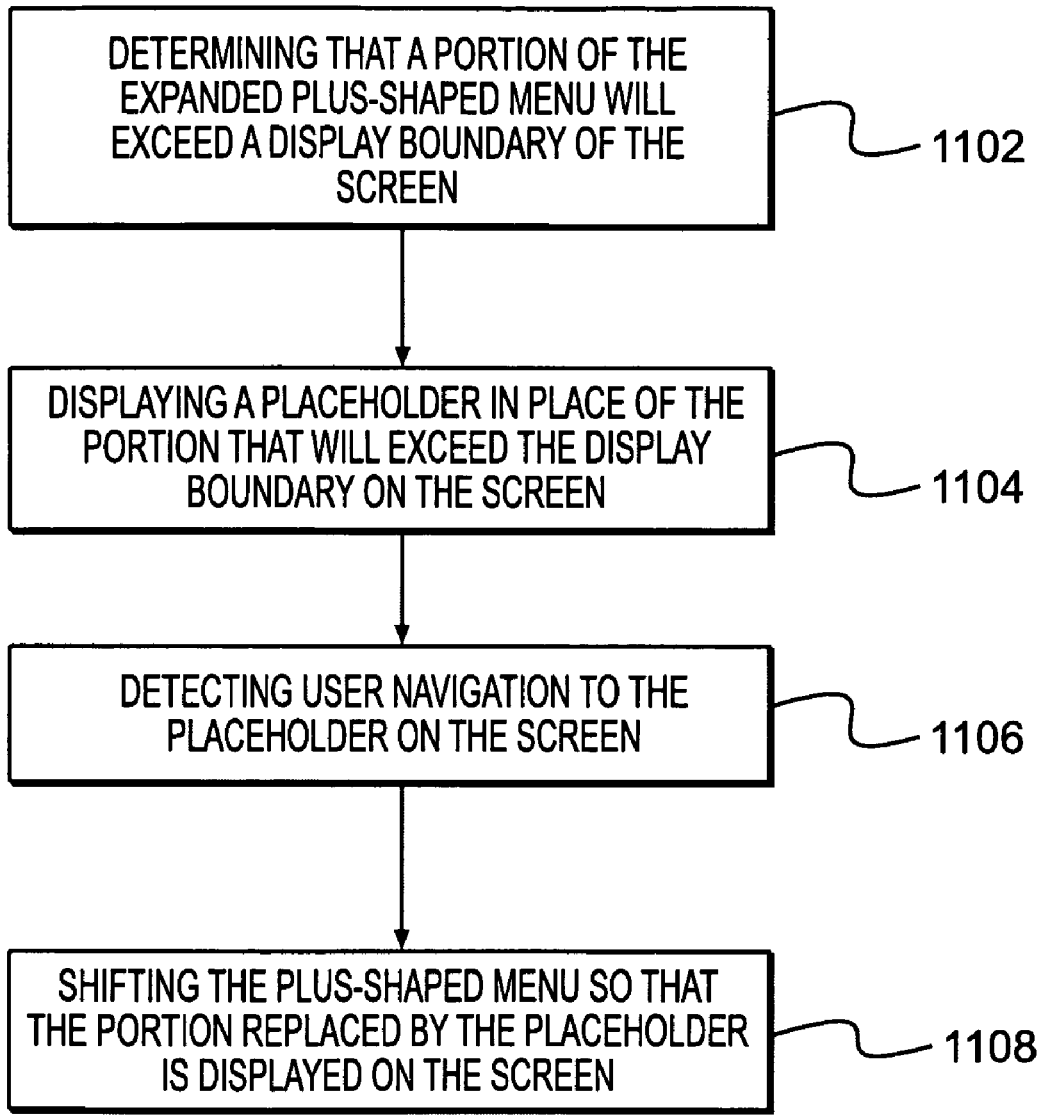
FIG. 11 is a flowchart showing stages involved in replacing a portion of a plus-shaped menu with a placeholder.

Illustrative processes for presenting a plus-shaped menu on a user interface screen as shown in the above FIGS. 1-8 will be discussed in more detail below in connection with the flowcharts of FIGS. 9-11. It will be understood that FIGS. 9-11 are merely illustrative of the stages that may be involved in such processes. Stages may be added, eliminated, rearranged, or otherwise modified without departing from the spirit of the present invention.

FIG. 9 shows an illustrative flowchart having stages involved in displaying an expandable plus-shaped menu on a user interface screen consistent with the principles of the present invention. At step 902, an option for launching a plus-shaped menu, such as option 102 of FIG. 1, may be displayed in the user interface screen. In some suitable arrangements, the launch option may be presented in the form of a selectable indicator that indicates to the user that the launch option is associated with a plus-shaped menu. As an example, a plus-shaped indicator may be provided as shown in FIG. 1. Alternatively, a textual option may provide similar information to the user. In some suitable arrangements, the launch option may be no different from any such launch option that may be associated with a traditional selectable menu.

At step 904, a plus-shaped menu may be displayed on the user interface screen in response to a user selection of the menu launch option of step 902. The plus-shaped menu, for example, as shown in FIG. 2, may be arranged in such a way as to resemble a plus sign. More specifically, in the illustrated example, the plus-shaped menu may include a center option and up to four other options arranged to the left, right, upward, and downward relative to the center option. As discussed briefly in connection with FIG. 2, the position of each of the options may be associated with certain option categories so as to maintain a consistent and/or predictable navigation format or process flow for the user. As an example, the option to the right of the center option may be associated with an option category that is directed to actions that may be performed upon the subject matter of interest. As another example, the upward option in the plus-shaped menu may be associated with help-related options. It will be understood that any suitable arrangements of options in the plus-shaped menu may be implemented without departing from the spirit of the present invention.

In some suitable arrangements, one of the options in plus-shaped menu, such as the center option in FIG. 2, may be highlighted or otherwise indicated as being the current focus for user navigation purposes. In other suitable arrangements, such highlighting or navigation position indications may be provided upon user action.

At step 906, the user may be allowed to navigate to an option in the plus-shaped menu by, for example, clicking on the desirable option, hovering a mouse pointer over the option, using arrow keys on a keyboard to move in the direction of the option, using a joystick to navigate to the option, or using any other suitable navigation method to indicate an interest in an option. The option to which the user wishes to navigate may become highlighted or otherwise indicated as a response to the user navigation action. In some suitable arrangements, the user may navigate between options using directional indications that expand beyond the four options of left, right, up, and down. For example, in connection with the plus-shaped menu 202 of FIG. 2, the user may navigate from option 210 on the right to 212 on the bottom by providing a combination left-down command using any one of the navigation methods described above.

At step 908 and in response to the user navigating to a particular option at stage 906, the plus-shaped menu may be expanded to include at least one additional option, which may be associated with the option that is navigated to at stage 906. An example of such an expansion is shown in FIG. 3. The at least one additional option may be displayed in any of a left, right, up, or down position in the expanding plus-shaped menu relative to the option navigated to by the user. As discussed in connection with FIG. 3, the at least one additional option may be prevented to be displayed over any existing options in the plus-shaped menu in some suitable arrangements. However, in other suitable arrangements, such a layered display may be permitted, for example, when the top layer option is displayed in a smaller format to allow the lower layer option to show through. Any other arrangements of allowing two or more options to be displayed in one relative portion of the plus-shaped menu may be implemented without departing from the spirit of the present invention.

FIG. 10 shows an illustrative flowchart having stages involved in displaying an expandable plus-shaped menu, such as the one discussed above in FIG. 9 and illustrated in FIGS. 2-8, consistent with the principles of the present invention.

At stage 1002, user navigation to an initial option in a plus-shaped menu in a user interface screen, for example, as described above, may be detected. In response to such detection, a determination may be made with regard to whether the option navigated to by the user is associated with at least one related option at stage 1004. Such a determination may be performed, for example, against a suitable database containing related options or using any other suitable known search method. If at least one related option is identified as a result of the determination stage 1004, the plus-shaped menu may be expanded, as shown in FIG. 3, to display the at least one related option at stage 1006. As described above, displaying of the at least one related option may be done in such a way as not to obstruct, for example, display over, any other options in the plus-shaped menu at stage 1006. If, however, no related option is identified as a result of the determination stage 1004, the user may be allowed to select the option of stage 1002 at stage 1008. An example of such a selection was described above in connection with FIG. 4.

FIG. 11 shows an illustrative flowchart having stages involved in replacing a portion of a plus-shaped menu with a placeholder consistent with the principles of the present invention. At stage 1102, a determination may be made, for example, during the process to expand a plus-shaped menu to incorporate additional options, that a portion of the expanded plus-shaped menu will exceed a display boundary of the user interface screen. In response to such a determination, a placeholder such as placeholder 508 of FIG. 5 or any other suitable placeholder may be displayed in place of the portion of the plus-shaped menu that is determined to exceed the display boundary of the user interface screen at stage 1104. As described in connection with FIG. 5, the placeholder may be constructed in such a way as to display within the display boundary of the user interface screen. The placeholder may additionally include a suitable indicator, which indicates that it may be expanded or otherwise manipulated to reveal the portion of the plus-shaped menu that it replaced.

At stage 1106, user navigation to the placeholder of stage 1104 may be detected. User navigation to the placeholder may be provided in the same way as user navigation to any other fully displayed options in the plus-shaped menu, which is described above. In response to such detection, the plus-shaped menu may be shifted, as shown in FIG. 6, so that the portion replaced by the placeholder may be displayed on the user interface screen. As described above, in some suitable arrangements, this shift may be automatic from stage 1102 so a placeholder such as the one of step 1104 may be used to replace another portion of the plus-shaped menu, which may be displaced by the newly expanded portion of the plus-shaped menu.

A computer system may be used to install a software application implementing a system and method for providing a plus-shaped menu consistent with the principles of the present invention. The computer system may be a computer network, as shown in FIG. 12, or a stand-alone personal computer (PC), as shown in FIG. 13.

Figure 12:
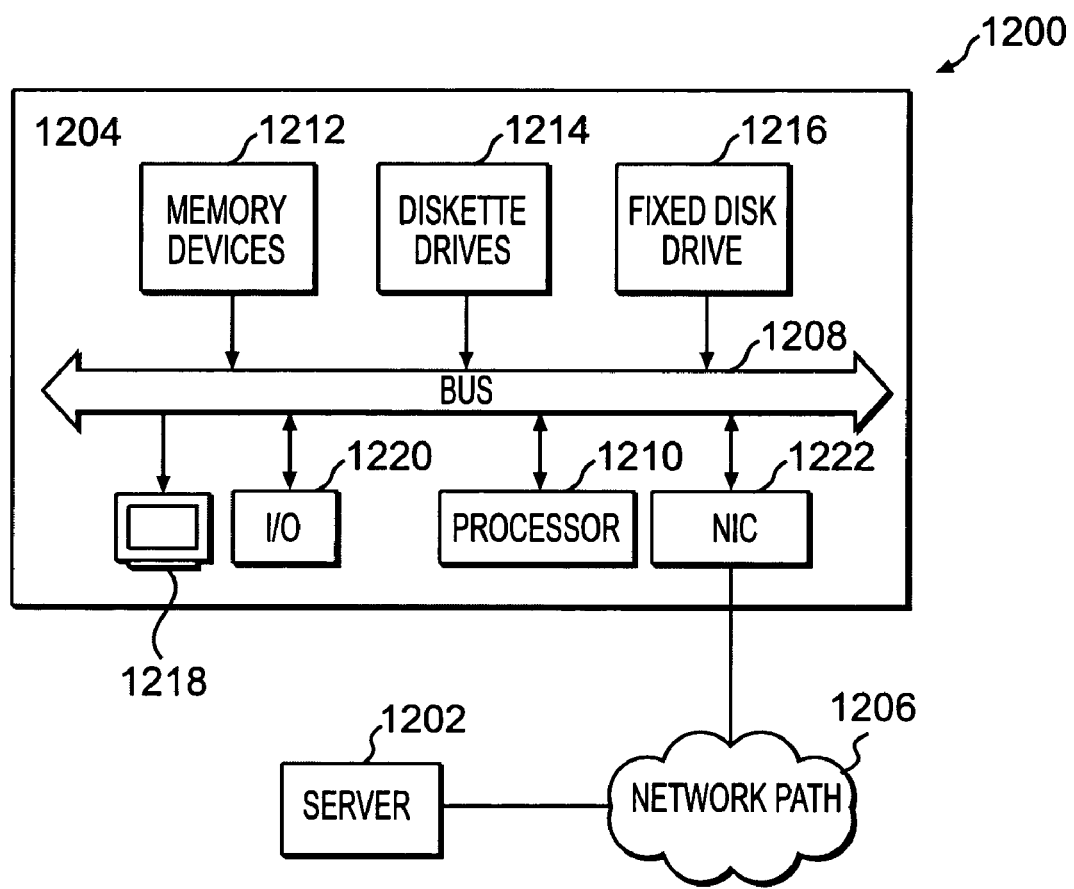
FIG. 12 is a block diagram of an illustrative computer system for implementing a software application.
Figure 13:
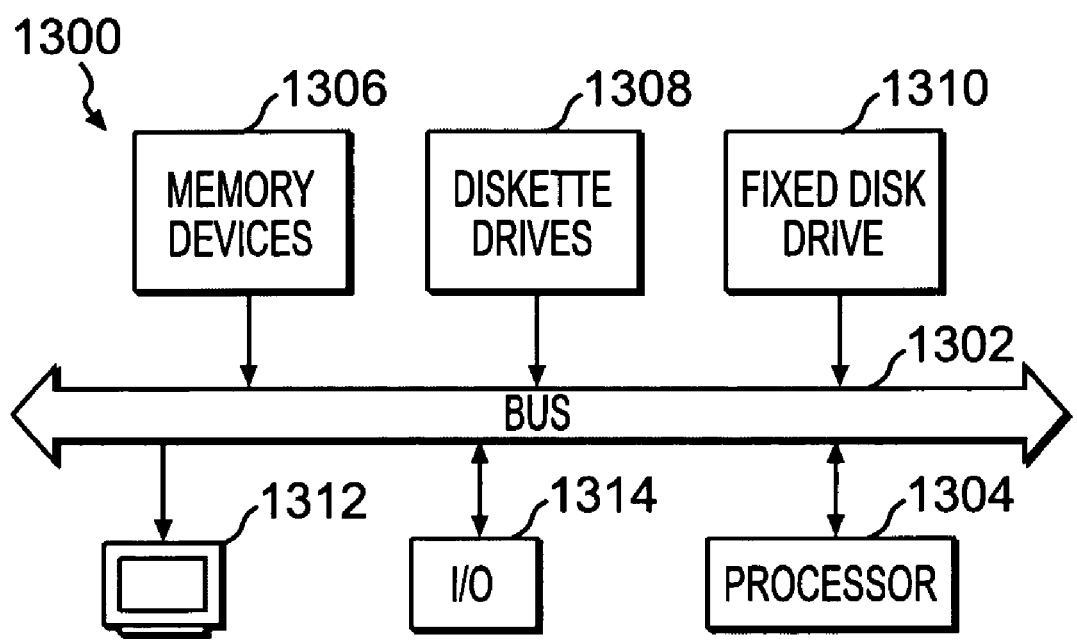
FIG. 13 is a block diagram of another illustrative computer system for implementing a software application.

As shown in FIG. 12, a computer network 1200 in accordance with systems consistent with the principles of the present invention may include a server 1202 and a stand-alone PC 1204 connected through a network path 1206. Computer network 1200 may be a local area network (LAN), where server 1202 and PC 1204 are workstations. Computer network 1200 may also be the Internet, with server 1202 hosting a web application and PC 1204 being any workstation available to a user desiring to interface with the application on server 1202. Alternatively, computer network 1200 may be a wide area network (WAN), and server 1202 and PC 1204 may lie in two separate LANs connected through the Internet.

PC 1204 may include a bus line 1208 connecting a plurality of devices such as a processor 1210, memory devices 1212 for storage of information, diskette drives 1214, a fixed disk drive 1216, a monitor or display 1218, other I/O devices 1220, and a network interface card (NIC) 1222. Processor 1210 may be a microprocessor such as an Intel Pentium™ chip for processing applications. Memory devices 1212 may include read-only memories (ROM) and/or random access memories (RAM). Diskette drives 1214 may include a floppy drive and/or a compact disk (CD) drive. Fixed disk drive 1216 may be a hard drive. I/O devices 1220 may include a keyboard and/or a mouse for receiving input from a user of PC 1204. Monitor or display 1218 may display output from processor 1210, and may also echo the input of the user. PC 1204 may be connected to network path 1206 through NIC 1222.

A web application may be installed on server 1202. An individual desiring to enter data into the application on server 1202 may use a web browser loaded on PC 1204, and may communicate with server 1202 through NIC 1222 and network path 1206. In one aspect, software application for implementing a system consistent with the principles of the present invention may be stored in PC 1204 and processor 1210 of PC 1204 may execute the software application locally within PC 1204 and interface with a web application on server 1202. Particularly, the software application may be stored on a floppy disk, a CD, or any other suitable readable media, which may be accessible by diskette drive 1214, fixed disk drive 1216, or any other suitable mechanism. In another aspect, the software application for implementing a system consistent with the principles of the present invention may be stored in server 1202, which may execute the software application, and processor 1210 of PC 1204 may communicate with server 1202 to send information to server 1202 and retrieve the results of the execution of the software application from server 1202.

Through the execution of the software application implementing a system consistent with the principles of the present invention, either locally within PC 1204 or remotely within server 1202, an interface or screen may be provided on a user display, which enables the display of plus-shaped menus.

Alternatively, as shown in FIG. 13, a stand-alone PC 1300 may be used for implementing a software application implementing a system consistent with the principles of the present invention. PC 1300 may include a bus line 1302 connecting a plurality of devices, which may include a processor 1304, memory devices 1306 for storage of information, diskette drives 1308, a fixed disk drive 1310, a monitor or display 1312, and other I/O devices 1314. Processor 1304 may be a microprocessor such as an Intel Pentium™ chip for processing applications. Memory devices 1306 may include ROM and/or RAM. Diskette drives 1308 may include a floppy drive and/or a compact disk (CD) drive. Fixed disk drive 1310 may be a hard drive. Monitor or display 1312 may display the output of processor 1304 and may also echo the input of the user. I/O devices 1314 may include a keyboard and/or a mouse for receiving input from a user of PC 1300.

A software application implementing a system consistent with the principles of the present invention may be stored on a floppy disk or a CD accessible by diskette drive 1308 or on fixed disk drive 1310. Processor 1304 may execute the software application stored in the floppy disk the CD or the fixed disk drive 1310. An individual, through monitor or display 1312 and I/O devices 1314, may interact with processor 1304, which may execute the software application. A software application implementing a system consistent with the principles of the present invention may be written in any number of programming languages, including but not limited to Java-Script, Visual Basic, Flash, ABAP coding, or any other suitable language. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for providing a menu on a user interface screen, the method being implemented by one or more data processors and comprising:
    displaying, by at least one data processor, a menu launch option on the user interface screen;
    displaying a plus-shaped menu on the user interface screen in response to a selection of the menu launch option by a user, wherein the plus-shaped menu includes a center option and four other options each displayed in a left, right, up, and down portion of the plus-shaped menu relative and adjacent to the center option, the up, center, and down portions arranged along a first axis, and the left, center, and right options arranged along a second axis, the second axis being perpendicular to the first axis, the center and four other options having rectangular sizes;
    allowing the user to navigate to a first of the four other options displayed in the plus-shaped menu;
    receiving user-generated input selecting the first of the four other options; and
    expanding the plus-shaped menu to include at least one additional option, wherein the at least one additional option is associated with the selected first option and wherein the at least one additional option is displayed on a top layer wholly within one of a left, right, up, and down portion of the expanded plus-shaped menu such that a first section of a bottom layer displaying the corresponding left, right, up, or down portion of the expanded plus-shaped menu is visible around the at least one additional option and a second section of the bottom layer displaying the corresponding left, right, up, or down portion of the expanded plus-shaped menu is visibly obscured by the at least one additional option, the second section of the bottom layer being different than the first section of the bottom layer and including visually distinct graphical elements obscured by the at least one additional option.

2. The method of claim 1, wherein allowing the user to navigate to the first option comprises:
    determining whether the first option is associated with at least one related option;
    if the first option is associated with at least one related option, expanding the plus-shaped menu to display the at least one related option in at least one of a left, right, up, and down portion of the plus-shaped menu relative to the first option; and
    if the first option is not associated with at least one related option, allowing the user to select the first option.

3. The method of claim 1, further comprising appending another form of a selectable menu to at least one portion of the plus-shaped menu.

4. The method of claim 3, wherein the other form of selectable menu is a drop down menu.

5. The method of claim 1, further comprising:
    determining that a portion of the plus-shaped menu will exceed a display boundary of the user interface screen; and
    displaying a placeholder in place of the portion of the expanded plus-shaped menu that will exceed the display boundary of the user interface screen, wherein the placeholder is constructed to display within the display boundary.

6. The method of claim 5, further comprising:
    detecting user navigation to the placeholder in the plus-shaped menu; and
    shifting the plus-shaped menu so that the portion of the plus-shaped menu replaced by the placeholder is displayed on the user interface screen.

7. The method of claim 1, wherein at least one option of the plus-shaped menu includes a selectable menu.

8. The method of claim 7, wherein the selectable menu is a drop down menu.

9. The method of claim 7, wherein the selectable menu is a multiply-selectable menu.

10. A computer program product as in claim 1, wherein the center and four other options have substantially identical rectangular sizes.

11. A computer program product tangibly embodied on computer readable storage media for causing a computer system to generate a user interface, the user interface comprising:
    a menu launch option displayed on the user interface; and
    a plus-shaped menu displayed on the user interface in response to a selection of the menu launch option by a user, wherein the plus-shaped menu is configured to include a center option and up to four other options each displayed in a left, right, up, and down portion of the plus-shaped menu relative and adjacent to the center option, the up, center, and down portions arranged along a first axis, and the left, center, and right options arranged along a second axis, the second axis being perpendicular to the first axis, the center and four other options having rectangular sizes;

the plus-shaped menu is further configured to expand, in response to user navigation to a first option, to include at least one additional option, wherein the at least one additional option is associated with the first option and wherein the at least one additional option is displayed wholly within one of a left, right, up, and down portion of the expanded plus-shaped menu such that a first section of a bottom layer displaying the corresponding left, right, up, or down portion of the expanded plus-shaped menu is visible around the at least one additional option and a second section of the bottom layer that would otherwise display graphical elements of the corresponding left, right, up, or down portion of the expanded plus-shaped menu is visually obscured by the at least one additional option, the second section of the bottom layer being different than the first section of the bottom layer and including visually distinct graphical elements obscured by the at least one additional option.

12. The computer program product of claim 11, wherein the plus-shaped menu is further configured to:

expand, in response to a determination that the first option is associated with at least one related option, to display the at least one related option in at least one of a left, right, up, and down portion of the plus-shaped menu relative to the first option; and provide the first option as a selectable option, in response to a determination that the first option is not associated with at least one related option.

13. The computer program product of claim 11, wherein the plus-shaped menu is further configured to include another form of a selectable menu as an appended item to at least one portion of the plus-shaped menu.

14. The computer program product of claim 13, wherein the other form of selectable menu is a drop down menu.

15. The computer program product of claim 11, wherein the plus-shaped menu is further configured to display, in response to a determination that a portion of the plus-shaped menu will exceed a display boundary of the user interface, a placeholder in place of the portion of the expanded plus-shaped menu that will exceed the display boundary of the user interface screen, wherein the placeholder is constructed to display within the display boundary.

16. The computer program product of claim 15, wherein the plus-shaped menu is further configured to shift, in response to a detection of user navigation to the placeholder in the plus-shaped menu, so that the portion of the plus-shaped menu replaced by the placeholder is displayed on the user interface screen.

17. The computer program product of claim 11, wherein at least one option of the plus-shaped menu includes a selectable menu.

18. The computer program product of claim 17, wherein the selectable menu is a drop down menu.

19. The computer program product of claim 17, wherein the selectable menu is a multiply-selectable menu.

20. A computer program product tangibly embodied on computer readable storage media for causing a computer system to perform operations comprising:

displaying a menu launch option on a user interface screen;

displaying a plus-shaped menu on the user interface screen in response to a selection of the menu launch option by a user, wherein the plus-shaped menu includes a center option and four other options each displayed in a left, right, up, and down portion of the plus-shaped menu relative and adjacent to the center option, the up, center, and down portions arranged along a first axis, and the left, center, and right options arranged along a second axis, the second axis being perpendicular to the first axis, the center and four other options having rectangular sizes;

allowing the user to navigate to a first of the four other options displayed in the plus-shaped menu;

receiving user-generated input selecting the first of the four other options; and expanding the plus-shaped menu to include at least one additional option, wherein the at least one additional option is associated with the selected first option and wherein the at least one additional option is displayed on a top layer wholly within one of a left, right, up, and down portion of the expanded plus-shaped menu such that a first section of a bottom layer displaying the corresponding left, right, up, or down portion of the expanded plus-shaped menu is visible around the at least one additional option and a second section of the bottom layer displaying the corresponding left, right, up, or down portion of the expanded plus-shaped menu is visibly obscured by the at least one additional option, the second section of the bottom layer being different than the first section of the bottom layer and including visually distinct graphical elements obscured by the at least one additional option.

\* \* \* \* \*